United States Patent [19]

Franck et al.

[11] Patent Number: 4,722,780

[45] Date of Patent: Feb. 2, 1988

[54] CATALYTIC REFORMING PROCESS

[75] Inventors: Jean-Pierre Franck, Bougival; Jean-Paul Bournonville, Cergy Pontoise; Maurice Berthelin, St. Symphorien D'Ozon, all of France

[73] Assignee: Institut Francais du Petrole, Rueil-Malmaison, France

[21] Appl. No.: 38,561

[22] Filed: Apr. 15, 1987

[30] Foreign Application Priority Data

Apr. 16, 1986 [FR] France ................................ 86 05567
Mar. 3, 1987 [FR] France ................................ 87 02970

[51] Int. Cl.$^4$ ............................................ C10G 35/06
[52] U.S. Cl. .................................................... 208/65
[58] Field of Search ......................................... 208/65

[56] References Cited

U.S. PATENT DOCUMENTS 3,658,691  4/1972  Keith et al. .
4,436,612  3/1984  Oyekan et al. ........................ 208/65
4,464,249  8/1984  Mooi et al. ............................ 208/65

Primary Examiner—Curtis R. Davis
Attorney, Agent, or Firm—Millen & White

[57] ABSTRACT

A catalytic reforming process using catalysts containing a carrier, platinum, rhenium and optionally at least one metal selected from the group consisting of tin, germanium, lead, indium, thallium and titanium, arranged in several successive catalyst beds wherein the catalyst of the first bed has a Re/Pt ratio higher than the Re/Pt ratio of the catalyst used in the last bed, said catalyst of the last bed containing at least 0.08% of rhenium in proportion to the carrier.

The catalysts preferably contain at least one halogen in an amount, expressed in proportion to the carrier, from 0.1 to 15%, said carrier preferably consisting mainly of alumina.

In a preferred embodiment 3 successive catalyst beds are used wherein the Re/Pt ratios are, as a whole, decreasing from the first bed to the last bed.

14 Claims, No Drawings

CATALYTIC REFORMING PROCESS

BACKGROUND OF THE INVENTION

Catalytic reforming or hydroreforming is a well known process in the refining industry whose object is generally to improve the octane number of heavy gasolines or of straight-run gasolines and/or to produce aromatic hydrocarbons. This operation must be achieved on an industrial scale with the highest possible yield to the desired products: basic components for motor fuels or aromatic compounds for the petrochemical industry. Usually the yield is measured by the product amount of gasoline containing hydrocarbons of five carbon atoms or more, commonly called $C_5+$ gasoline cut, expressed in proportion to the introduced charge.

Presently, another factor, directly associated to the latter, has an increasing importance: the hydrogen production. The desired object is to obtain the highest possible yield of both $C_5+$ cut and hydrogen.

In the near future, the application of antipollution standards will lead to a decrease of the lead concentration in gasolines so as to avoid, in the long term, the presence of lead organic additives in motor fuels for spark-ignition engines. This regulation obliges the refiners to increase the severity of the operating conditions of reforming units in order to comply with the quality criteria required for satisfactory running conditions of car engines. Moreover, refining restructuration which more and more favors conversion and hydrotreatment units will substantially increase the hydrogen requirements of the refineries. These additional hydrogen requirements will have to be satisfied to a large extent by catalytic reforming or hydroreforming processes whose operating conditions are so adjusted as to meet this demand.

The greater severity of the operating conditions in industrial units, for example decrease of the operating pressure and, if necessary, increase of the temperature, is thermodynamically favorable to reactions producing the desired products (aromatics and hydrogen) but is highly detrimental to the stability of the catalysts. As a matter of fact, this increased severity results in an increase of the rate of hydrocarbon deposit, as coke, on the catalyst, which is responsible for a more rapid loss of catalyst activity.

This evolution requires a more frequent regeneration of catalysts and, accordingly, a decrease of operation time and hence of total treatment capacity of industrial units. It is clear that any improvement in the catalyst stability will result in a decrease of the regeneration frequency or, otherwise stated, in a lengthening of the operation time between two successive regeneration steps, which constitutes significant progress toward a more rational use of industrial units.

The catalysts used in catalytic reforming generally comprise, as an essential element, alumina containing a noble metal from group VIII of the periodic classification of elements, generally platinum for first generation catalysts such for example as those catalysts disclosed by V. HAENSEL in OIL AND GAS JOURNAL, vol. 48 No. 47 pages 82 and following, 1950. A second generation of catalysts has subsequently appeared, where a so-called promoter is added to the group VIII metal. Examples of the most usual promoters are rhenium (U.S. Pat. No. 3,415,737), tin (U.S. Pat. No. 3,700,588), indium and thallium (U.S. Pat. No. 2,814,599). Substantial improvements in stability and/or selectivity on the so-called first generation catalysts were obtained by the addition of these different promoters. The addition of two promoter elements has also been described as substantially improving the stability and/or selectivity. A catalyst comprising an alumina carrier, platinum, rhenium and tin is for example disclosed in U.S. Pat. No. 3,702,294.

These various catalysts have been tested and/or used over long periods, for example as long as one year or even longer. Each catalyst formula simultaneously offers advantages and suffers from disadvantages:

platinum-rhenium catalyst has an excellent stability but does not give the maximum selectivity for the production of high grade gasolines, platinum-tin, platinum-indium or platinum-thallium catalysts provide for an excellent selectivity but their stability is much lower than that of the platinum-rhenium catalyst, the catalysts containing three metals (e.g. platinum, rhenium and tin) have neither the stability of platinum-rhenium nor a selectivity equivalent to that of platinum-tin, platinum-indium or platinum-thallium.

In order to improve the stability of the catalysts containing platinum and rhenium, deposited on alumina, an increase of the atomic or weight ratio between the rhenium amount and the platinum amount contained in the catalyst has been proposed and disclosed in the Belgian Pat. No. 875,386 (corresponding to GB-A-No. 2018278).

In this Belgian patent, the described catalyst composition has a rhenium-to-platinum ratio by weight from 2 to 5 and preferably from 2.25 to 4. The use of catalysts of increased rhenium content will result in a relative lengthening of the cycle, which may exceed by 65% the cycle involving the use of catalysts containing substantially the same amount of metals: platinum+rhenium. Nevertheless, the use of catalysts of increased rhenium content generally results in a decrease of the $C_5+$ gasoline yield by more than 1% by weight. Moreover, the positive effect of an increased rhenium content on the stability is only observed when the sulfur content of the treated naphtha is lower than 0.5 ppm by weight.

In order to avoid this selectivity decrease, due to the use of catalysts of higher rhenium content in all the reactors, it has been suggested to use a platinum-rhenium catalyst whose rhenium-to-platinum ratio by weight is lower than or equal to about 1, in the one or more first reactors and a platinum-rhenium catalyst having a rhenium-to-platinum ratio by weight higher than or equal to about 2, in the one or more last reactors. Such arrangements are for example disclosed in the following documents: French Pat. No. 2 467 236, U.S. Pat. Nos. 4,427,533 and 4,436,612. They provide for an equivalent or higher stability and a slightly improved selectivity to $C_5+$ gasoline cut as compared with the catalyst containing platinum and rhenium in a ratio by weight lower than or equal to about 1, used in all the reactors.

Furthermore, according to the European patent application No. 153 891, the use in the first reactor of a catalyst having a better stability than that of the catalysts used in the other reactors results in a substantial improvement of the stability and selectivity of all of the catalyst beds contained in the different reactors of the unit.

SUMMARY OF THE INVENTION

The present invention has as an object the production of gasolines of required quality over long periods, with a very satisfactory selectivity. Another object is to obtain relatively high amounts of hydrogen.

Surprisingly, it has been discovered that increased yields of $C_5^+$ cut and hydrogen may be obtained by circulating a charge of hydrocarbons in reforming conditions, in the presence of hydrogen, successively through at least two fixed catalyst beds, each bed comprising a catalyst containing a carrier, platinum, rhenium and optionally at least one halogen, the catalyst of the one or more first beds wherethrough passes the charge being a catalyst of the so-called A type, whose rhenium-to-platinum weight ratio (Re/Pt) (expressed as elemental metal) is higher than the Re/Pt ratio by weight of the catalyst of the so-called B type contained in the one or more last bed(s) wherethrough passes the charge, said catalyst of B type containing at least about 0.08% by weight of rhenium, in proportion to the carrier. Catalysts of A type and B type may contain identical or different constituents.

According to an advantageous embodiment of the invention the two types of catalyst comprise the same carrier and generally the same halogen, the only difference being the Re/Pt ratio by weight.

According to another advantageous embodiment, at least one type of catalyst (type A and/or type B) contains at least one metal M selected from the group formed of tin, germanium, lead, indium, thallium and titanium. As metals M, indium and/or tin are preferred.

The amount of metal M contained in the catalyst is usually from about 0.01 to 3%, preferably from about 0.01 to about 1% by weight of metal, in proportion to the carrier.

A relatively low amount, of metal M e.g. about 0.01% to about 0.1% by weight and even about 0.01% to about 0.06% by weight, is generally sufficient to obtain a substantial effect on the results.

The essential point of the invention is that the catalyst contained in the one or more first beds wherethrough passes the charge has a Re/Pt ratio by weight higher than the Re/Pt ratio by weight of the catalyst contained in the one or more last beds wherethrough passes the charge.

In an advantageous embodiment of the invention, the catalyst of A type is a catalyst whose Re/Pt ratio by weight ranges from 1:1 to 5:1 and the catalyst of B type is a catalyst whose Re/Pt ratio by weight ranges from 0.1:1 to 3:1; preferably the catalyst of A type has a Re/Pt ratio by weight from 1.6:1 to 4:1 and the catalyst of B type a Re/Pt ratio by weight from 0.5:1 to 1.5:1 and more preferably the Re/Pt ratio by weight of the catalyst of A type is from 2:1 to 3:1 and the Re/Pt ratio by weight of the catalyst of B type from 0.8:1 to 1.1:1.

The catalyst carriers (identical or different) used according to the present invention are generally selected from the oxides of metal from groups II, III and/or IV of the periodic classification of elements, such for example as magnesium, aluminum, titanium, zirconium, thorium or silicon oxides, either alone or as mixture with one another or with oxides for other elements of the periodic classification of elements, such for example as boron. Coal can also be used. Also zeolites or molecular sieves of X or Y types, or of mordenite or faujasite type or of ZSM-5, ZSM-4, ZSM-8 etc. type, can also be used as well as mixtures of oxides of metals from groups II, III and/or IV with zeolitic material.

More preferably the carrier is mainly formed of alumina, i.e. the alumina amount is at least 50% by weight of the total weight of the carrier, preferably at least 80% by weight and more preferably the carrier consists exclusively of alumina.

The catalysts used according to the present invention advantageously contain about 0.05 to 3% of platinum and about 0.08 to 3% of rhenium by weight in proportion to the carrier. Preferably, the catalyst of A type contains about 0.05 to 0.6% of platinum and about 0.10 to 3% of rhenium and the catalyst of B type about 0.05 to 0.6% of platinum and about 0.10 to 1% of rhenium in proportion by weight to the carrier. More preferably, the catalyst of A type contains about 0.1-0.5% of platinum and about 0.1-2% and more particularly about 0.2-1.5% of rhenium by weight and the catalyst of B type about 0.1-0.5% of platinum and about 0.10-0.9%, more particularly about 0.15-0.75%, of rhenium, in proportion to the carrier.

The rhenium and platinum proportions are necessarily so selected that the Re/Pt ratio by weight of the catalyst contained in the one or more first catalyst beds wherethrough passes the charge be higher than the Re/Pt ratio by weight of the catalyst contained in the one or more last catalyst beds wherethrough passes the charge.

In order to increase the catalyst yields in reforming operations, it is generally advantageous to add at least one halogen to the catalysts.

Preferably, chlorine and/or fluorine are used. Halogen is introduced into the catalyst by any process, at any time of its preparation and/or regeneration or during the reaction. The halogen may be also introduced as a halogenated compound such as for example a hydrogen halide or halogenated organic compound, such for example as carbon tetrachloride. Halogen is advantageously used when the carrier is alumina.

The amount of halogen or halogenated compound will be preferably such that the catalyst contain from 0.1 to 15% by weight and preferably from 0.2 to 5% by weight of at least one halogen, in proportion to the carrier.

The proportion of weight of catalyst of B type used in the one or more last catalyst beds wherethrough passes the charge is advantageously from 60 to 92% and preferably from 80 to 90% by weight of the total catalyst mass used in the process.

As well known in the art, reforming reactions are endothermic. Thus, usually, a series of adiabatic reactors containing the catalyst beds are used, heating means being preferably provided for intermediate heating between each reactor or between each catalyst bed wherethrough passes the charge.

More preferably, the process according to the invention consists of circulating the hydrocarbon charge successively through at least three fixed beds of catalyst.

EXAMPLES

The following examples are given to illustrate a few embodiments of arragements according to the invention, but they must not be considered as limiting the scope thereof since many other arrangements of catalyst beds, at least partly in series, can be considered by those skilled in the art without departing from the invention, whose essential feature is that the charge first passes through at least one catalyst bed containing a catalyst whose Re/Pt ratio by weight is higher than the Re/Pt ratio by weight of the one or more last catalyst beds wherethrough passes the charge. The use of two or more catalyst beds in parallel is also within the scope of the invention.

A first example of arrangement consists of circulating the charge successively through at least three separate catalyst fixed beds, the first bed wherethrough passes the charge containing a catalyst of A type having a Re/Pt ratio by weight higher than the respective Re/Pt ratios by weight of the catalysts of A and/or B type, and of B type for the last bed, contained in the other catalyst beds. Thus, for example, when using three beds, the catalyst of the first bed will have a Re/Pt ratio by weight higher than the Re/Pt ratio by weight of the catalyst contained in the two following beds.

A second example of arrangement consists of circulating the charge successively through at least three separate catalyst fixed beds, each of the first and second catalyst beds wherethrough passes the charge containing a catalyst of A type whose respective Re/Pt ratios by weight are higher than the Re/Pt ratio by weight of the catalyst of B type contained in the one or more last catalyst beds wherethrough passes the charge. Thus, for example, when using three catalyst beds, the catalysts contained in the two first beds will have a Re/Pt ratio by weight higher than the Re/Pt ratio by weight of the catalyst contained in the last bed.

A third example of arrangement consists of circulating the charge successively through at least three separate catalyst fixed beds, whose catalysts are in a Re/Pt decreasing ratio, in the aggregate, from the first bed containing a catalyst of A type to the last bed containing a catalyst of B type.

In the various above-described arrangements 1 to 3, the various catalysts hereinbefore considered can be used. Thus, for example, a catalyst of A type and a catalyst of B type without metal M can be used; also a catalyst of A type and a catalyst of B type, each comprising at least one metal M (the one or more metals M introduced in each type of catalyst being identical or different) can also be used; also, for example, a catalyst of A type comprising at least one metal M and a catalyst of B type without metal M may be used; finally, a catalyst of A type without metal M and a catalyst of B type comprising at least one metal M may, for example, be used.

More precisely, when three catalyst beds are used in series in the same reactor or in several reactors, $r_a$ being the Re/Pt ratio by weight of the catalyst contained in the first catalyst bed wherethrough passes the charge, $r_b$ the Re/Pt ratio by weight of the catalyst contained in the second catalyst bed wherethrough passes the charge and $r_c$ the Re/Pt ratio by weight of the catalyst contained in the third and last catalyst bed wherethrough passes the charge, the following relationship will be strictly necessary according to the invention: $r_a > r_c$ or $r_a/r_c > 1$; the various following relationships being possible: $r_a \geq r_b$, $r_a < r_b$, $r_b \geq r_c$ and $r_b < r_c$. Among the latter the preferred relationships are:

* $r_a > r_b \geq r_c$ preferably with a $r_a$ value from 1.6:1 to 4:1 and more preferably from 2:1 to 3:1 and $r_b$ and $r_c$ values preferably ranging from 0.5:1 to 1.5:1 and more preferably from 0.8:1 to 1.1:1.
* $r_a > r_b > r_c$, with the preferred values as above indicated.
* $r_a \geq r_b$ and $r_b \geq r_c$, $r_a$ being always greater than $r_c$ and $r_a$ ranging preferably from 1.6:1 to 4:1 and more preferably from 2:1 to 3:1, whereas $r_b$ preferably ranges from 1:1 to 2:1 and $r_c$ preferably from 0.8:1 to 1.1:1.

In the herebefore described arrangements, preferentially comprising at least three catalyst beds, the catalyst of B type is preferably distributed among at least two catalyst beds, the first of these beds usually containing about 15 to 50% by weight and preferably from about 20 to about 45% by weight of the total catalyst amount of B type used in the process.

The various catalyst beds may be contained in a single reactor, preferably containing at least three separate superposed beds of catalyst, the upper bed containing a catalyst of A type when operating with downward flow and the lower bed containing a catalyst of A type when operating with upward flow.

The various catalyst beds may also be contained in at least two reactors, preferably arranged in series, for example side-by-side or superposed, the first reactor wherethrough passes the charge containing a catalyst of A type and the other reactors containing one or more catalyst beds of A and/or B type, and at least the last bed wherethrough passes the charge, in the last reactor, containing a catalyst of B type.

At the beginning of the reforming operations, the hydrogen and charge feed rates as well as the temperature and the pressure are adjusted within the operational conditions. The general reforming conditions are well known in the art; usually the catalytic reforming is conducted at a temperature from 400° to 600° C., under an absolute pressure from 0.1 to 3.5 MPa, at an hourly velocity (VVH) from 0.1 to 10 volumes of charge per volume of catalyst and per hour and with a hydrogen/hydrocarbon ($H_2$/HC) molar ratio from 1:1 to 20:1. The preferred conditions are: temperature from 500° to 580° C., pressure from 0.5 to 1.8 MPa, VVH from 1 to 10 and $H_2$/HC from 3:1 to 10:1.

In the reforming reactions, the lack of selectivity generally results in a poor yield of naphthene dehydrogenation to aromatic hydrocarbons and in parasitic cracking of paraffins with secondary formation of olefinic hydrocarbons which will initiate coke formation. The present process provides for a maximum dehydrogenation of naphthenic hydrocarbons to aromatic hydrocarbons, a minimum cracking of paraffins, avoiding the production of light hydrocarbons, with, on the contrary, a maximum conversion thereof to aromatic hydrocarbons. Thus, according to the invention, a first reaction zone containing a catalyst of excellent stability is used essentially for dehydrogenating hydrocarbons, particularly naphthenes, to aromatic hydrocarbons and the other reaction zones, in view of the selectivity obtained by selection of a convenient catalyst, are particularly used for the cyclization of paraffins without cracking thereof.

EXAMPLES

The following examples are given to illustrate the invention and must not be considered as limiting the scope thereof.

EXAMPLE 1

The charge to be treated has the following characteristics:
ASTM distillation: 90°–160° C.
density at 15° C.: 0.741 composition:
- paraffinic hydrocarbons: 60% by volume
- naphthenic hydrocarbons: 29% by volume
- aromatic hydrocarbons: 11% by volume The charge is treated with hydrogen under operating conditions equivalent, for the used catalysts, to accelerated ageing tests, these conditions being as follows:
- Pressure: 0.8 MPa (8 bars)
- Temperature: 510° C.
- $H_2$/HC (molar): 3
- Liquid charge hourly feed rate: 3 times the total catalyst volume.

The charge circulates successively through three reactors in series with catalyst fixed beds. Catalyst A contains by weight 0.25% of platinum and 0.5% of rhenium, in proportion to the catalyst carrier, consisting of an alumina having a specific surface of 220 m²/g and a pore volume of 0.58 cm³/g. Catalyst A further contains 1.15% of chlorine (the specific surface and the pore volume of catalyst A are respectively 215 m²/g and 0.56 cm³/g). The Re/Pt ratio by weight of catalyst A is 2.

Catalyst B comprises the same carrier as catalyst A and contains, by weight in proportion to said carrier:
- 0.25% of platinum,
- 0.25% of rhenium,
- 1.15% of chlorine.

The Re/Pt ratio by weight of catalyst B is 1.

The results obtained after 100 hours of run in the above-mentioned conditions for the following various types of catalyst bed arrangements are reported in Table 1 hereinafter:
- arrangement 1: catalyst A in all reactors,
- arrangement 2: catalyst B in all reactors,
- arrangement 3: catalyst A in the first reactor (15% by weight of the total catalyst amount) catalyst B in the second and third reactors (85% by weight of the total catalyst amount: 30% by weight in the second reactor and 55% by weight in the third reactor),
- arrangement 4:
  - catalyst A in the first and second reactors (40% by weight of the total catalyst amount),
  - catalyst B in the third reactor (60% by weight of the total catalyst amount),
- arrangement 5:
  - catalyst B in the first reactor (15% by weight of the total catalyst amount),
  - catalyst A in the second and third reactors (85% by weight of the catalyst amount),
- arrangement 6:
  - catalyst B in the first and second reactors (60% by weight of the catalyst amount),
  - catalyst A in the third reactor (40% by weight of the total catalyst amount),
- arrangement 7:
  - catalyst B in the first and second reactors (85% by weight of the total catalyst amount),
  - catalyst A in the third reactor (15% by weight of the total catalyst amount).

The results reported in Table 1 show that arrangements 3 and 4 according to the invention give the best yields to $C_5^+$ gasoline cut and hydrogen, while maintaining a high activity level.

TABLE 1

| ARRANGEMENT | 1 | 2 | 3 | 4 | 5 | 6 | 7 |
|---|---|---|---|---|---|---|---|
| $H_2$ | 2.70 | 2.78 | 2.98 | 2.80 | 2.74 | 2.76 | 2.76 |
| $CH_4 + C_2H_6$ | 3.06 | 2.43 | 2.09 | 2.61 | 2.86 | 2.89 | 2.60 |
| $C_3H_8 + C_4H_{10}$ | 6.24 | 5.79 | 4.93 | 5.29 | 5.85 | 5.90 | 5.85 |
| $C_5^+$ | 88.00 | 89.00 | 90.00 | 89.30 | 88.55 | 88.45 | 88.79 |
| Characteristics of $C_5^+$ fraction | | | | | | | |
| $d_4^{15}$ | 0.799 | 0.790 | 0.800 | 0.793 | 0.798 | 0.797 | 0.791 |
| RON | 97.4 | 96.1 | 97.5 | 96.8 | 97.3 | 97 | 96.4 |
| olefin % b.w.(*) | 0.4 | 0.8 | 0.3 | 0.4 | 0.4 | 0.6 | 0.7 |
| naphthene % b.w.(**) | 3.9 | 5.5 | 4.0 | 4.0 | 4.8 | 5.0 | 5.2 |
| aromatic % b.w. | 67.6 | 65.5 | 67.8 | 66.6 | 67.5 | 67.2 | 66.5 |

(*)coke precursor
(**)related to the dehydrogenating activity

EXAMPLE 2

The operating conditions are the same as in example 1 (arrangement 3) except that catalyst A is replaced with catalyst C which comprises the same carrier as catalyst A and contains, in proportion by weight to the carrier:
- 0.25% of platinum,
- 1.00% of rhenium,
- 1.15% of chlorine.

The Re/Pt ratio by weight of catalyst C is 4. After 100 hours of run, the performances are given in Table 2 which also reports the results of arrangements 1, 3 and 6 of example 1 and of arrangement 8 with catalyst C in the first reactor (15% by weight of the total catalyst amount) and catalyst B in the second and the third reactors (85% by weight of the total catalyst amount).

TABLE 2

| ARRANGEMENT | ARRANGEMENT 1 | ARRANGEMENT 3 | ARRANGEMENT 6 | ARRANGEMENT 8 |
|---|---|---|---|---|
| $H_2$ | 2.70 | 2.98 | 2.76 | 2.80 |
| $CH_4+C_2H_6$ | 3.06 | 2.09 | 2.89 | 2.60 |
| $C_3H_8+C_4H_{10}$ | 6.24 | 4.93 | 5.90 | 5.35 |
| $C_5^+$ | 88.00 | 90.00 | 88.45 | 89.25 |
| Characteristics of the $C_5^+$ fraction | | | | |
| $d_4^{15}$ | 0.799 | 0.800 | 0.797 | 0.795 |
| RON | 97.4 | 97.5 | 97.0 | 97.0 |
| olefin % b.w. | 0.4 | 0.3 | 0.6 | 0.5 |
| naphthene % b.w. | 3.9 | 4.0 | 5.0 | 4.1 |
| aromatic % b.w. | 67.6 | 67.8 | 67.2 | 67.0 |

The use, in the first reactor, of a fixed bed of platinum-rhenium catalyst whose rhenium-to-platinum ratio by weight is 4, gives slightly lower yields to hydrogen and to $C_5^+$ gasoline cut than those obtained with a catalyst arrangement in the different reactors wherein the first catalyst has a Re/Pt ratio by weight within the preferred range according to the invention.

It is also observed that arrangement 8 according to the invention provides for a better yield to $C_5^+$ gasoline cut and hydrogen than arrangements 1 and 6 not conforming with the invention, while maintaining a high activity level.

EXAMPLE 3

The operating conditions are the same as in example 1 (arrangement 3) except that catalyst A is replaced with catalyst D comprising the same carrier as catalyst A and containing, by weight in proportion to the carrier:
0.25% of platinum,
0.8% of rhenium,
1.15% of chlorine.

The rhenium/platinum ratio by weight of catalyst D is 3.2.

The performances, after 100 hours of run, are given in Table 3 where are also reported the performances of arrangement 3 of example 1. Arrangement 9 of this table comprises: catalyst D in the first reactor (15% by weight of the total catalyst amount), catalyst B in the second and third reactors (85% by weight of the total catalyst amount).

TABLE 3

| ARRANGEMENT | ARRANGEMENT 3 | ARRANGEMENT 9 |
|---|---|---|
| $H_2$ | 2.98 | 2.85 |
| $CH_4 + C_2H_6$ | 2.09 | 2.15 |
| $C_3H_8 + C_4H_{10}$ | 4.93 | 5.30 |
| $C_5^+$ | 90.00 | 89.70 |
| Characteristics of the $C_5^+$ fraction | | |
| $d_4^{15}$ | 0.800 | 0.798 |
| RON | 97.5 | 97.3 |
| olefin % by weight | 0.3 | 0.4 |
| naphthene % by weight | 4.0 | 4.1 |
| aromatic % by weight | 67.8 | 67.5 |

The use, in the first reactor, of a platinum-rhenium catalyst fixed bed having a rhenium-to-platinum ratio by weight of 3.2, hence close to rthe higher value in the range of the preferred values for this ratio, provides for a good yield to $C_5^+$ gasoline cut and to hydrogen. This yield is however slightly lower than that obtained with arrangement 3 wherein the first catalyst bed contains a catalyst A whose Re/Pt ratio by weight is within the more preferred range.

EXAMPLE 4

The operating conditions are the same as in example 1 except for the use in the first reactor of a catalyst F having the same carrier as catalyst A and containing, in proportion by weight to said carrier:
0.25% of platinum,
0.52% of rhenium,
1.15% of chlorine.

The Re/Pt ratio by weight of catalyst F is 2.08.

In the second reactor, a catalyst G is used which has the same carrier as catalyst A and contains, by weight in proportion to the carrier:
0.25% of platinum,
0.37% of rhenium,
1.15% of chlorine.

The Re/Pt ratio by weight of catalyst G is 1.48.

Catalyst B, described in example 1, is used in the third reactor.

Arrangement 10 is used. The amounts of catalysts F, G and B are respectively 15%, 40% and 45% by weight in proportion to the total catalyst amount, and the charge passes successively through catalyst F, then catalyst G and finally catalyst B. The results are given in Table 4 hereinafter.

EXAMPLE 5 (COMPARATIVE)

The operating conditions are the same as in example 1 with arrangement 6, except that catalyst A is replaced with catalyst H having the same carrier as catalyst A and containing, in proportion to the carrier:
0.25% of platinum,
1.15% of chlorine.

Catalyst H contains no rhenium, the Re/Pt ratio by weight of this catalyst is hence nil. Arrangement 11 comprises, in proportion to the total catalyst amount, 60% by weight of catalyst B distributed among the two first reactors and 40% by weight of catalyst H in the third reactor. The results are given in Table 4 hereinafter.

EXAMPLE 6 (COMPARATIVE)

The operating conditions are the same as in example 5, except for the use in the first and the second reactors of a catalyst I having the same carrier as catalyst H and containing, in proportion by weight to the carrier:
0.25% by weight of platinum,
0.48% by weight of rhenium,
1.15% by weight of chlorine.

The Re/Pt ratio by weight of catalyst I is 1.92.

The amount of catalyst I in the first and second reactors corresponds to 60% by weight and the amount of catalyst H in the third reactor to 40% by weight of the total catalyst amount: arrangement 12.

The rhenium and platinum amount by weight in all the three reactors is identical to that used in arrangement 3. The results reported in Table 4 hereinafter show that arrangements 3 and 4 according to the invention give a better yield to $C_5^+$ gasoline cut and to hydrogen than arrangements 11 and 12, not conforming with the invention.

TABLE 4

| ARRANGEMENT | 3 | 4 | 10 | 11 | 12 |
|---|---|---|---|---|---|
| $H_2$ | 2.98 | 2.80 | 2.96 | 2.60 | 2.65 |
| $CH_4 + C_2H_6$ | 2.09 | 2.61 | 2.11 | 3.00 | 3.20 |
| $C_3H_8 + C_4H_{10}$ | 4.93 | 5.29 | 5.03 | 7.40 | 7.60 |
| $C_5^+$ | 90.00 | 89.30 | 89.90 | 87.00 | 86.55 |
| Characteristics of the $C_5^+$ fraction | | | | | |
| $d_4^{15}$ | 0.800 | 0.793 | 0.799 | 0.782 | 0.786 |
| RON | 97.5 | 96.8 | 97.4 | 95.0 | 95.4 |
| olefin % b.w. | 0.3 | 0.4 | 0.4 | 2.2 | 2.0 |
| naphthene % b.w. | 4.0 | 4.0 | 4.0 | 8.5 | 7.5 |
| aromatic % b.w. | 67.8 | 66.6 | 67.7 | 62.5 | 64.5 |

EXAMPLE 7

The operating conditions are the same as in example 1 but with an arrangement 13 different from arrangement 3. In arrangement 13, the amount of catalyst A, placed in the first and the second reactors, corresponds to 50% by weight of the total catalyst amount. Catalyst B (50% by weight of the total catalyst amount) is placed in the third reactor. The results are given in Table 5 hereinafter.

EXAMPLE 8

The operating conditions are the same as in example 1—arrangement 3—where catalyst B is replaced with catalyst K in the second and third reactors. Catalyst K has the same carrier as catalyst A and contains, in proportion to said carrier:
- 0.25% by weight of platinum,
- 0.10% by weight of rhenium,
- 1.15% by weight of chlorine.

The Re/Pt ratio by weight of catalyst K is 0.4. Arrangement 14 comprises, in proportion to the total catalyst amount, 15% by weight of catalyst A in the first reactor and 85% by weight of catalyst K distributed among the second and third reactors.

The results are given in Table 5 hereinafter.

EXAMPLE 9 (COMPARATIVE)

The operating conditions are the same as in example 1—arrangement 3—except that catalyst B is replaced with catalyst J in the second and third reactors. Catalyst J has the same carrier as catalyst A and contains, in proportion to the carrier:
- 0.25% by weight of platinum
- 0.05% by weight of rhenium
- 1.15% by weight of chlorine.

The Re/PT ratio by weight of catalyst J is 0.2. Arrangement 15 comprises, in proportion to the total catalyst amount, 15% by weight of catalyst A in the first reactor and 85% by weight of catalyst J distributed among the second and third reactors. The results are given in Table 5 hereinafter.

TABLE 5

| ARRANGEMENT | 3 | 13 | 14 | 15 |
|---|---|---|---|---|
| $H_2$ | 2.98 | 2.79 | 2.79 | 2.65 |
| $CH_4 + C_2H_6$ | 2.09 | 2.68 | 2.35 | 2.95 |
| $C_3H_8 + C_4H_{10}$ | 4.93 | 5.40 | 5.56 | 7.20 |
| $C_5^+$ | 90.00 | 89.13 | 89.30 | 87.20 |
| Characteristics of the $C_5^+$ fraction | | | | |
| $d_4^{15}$ | 0.800 | 0.798 | 0.791 | 0.784 |
| RON | 97.5 | 97.3 | 96.3 | 95.2 |
| olefins % b.w. | 0.3 | 0.4 | 0.6 | 1.9 |
| naphthene % b.w. | 4.0 | 4.5 | 5.0 | 8.1 |
| aromatic % b.w. | 67.8 | 67.4 | 66.0 | 63.5 |

EXAMPLE 10

The operating conditions are the same as in example 1 but with the use, in arrangements 16 to 19, of at least one catalyst N, P or Q in at least one of the reactors.

Table 6 hereinafter summarizes the characteristics of the arrangements: type of catalyst and percent by weight of catalyst in proportion to the total catalyst amount used in all of the three reactors.

Catalyst N has the same carrier as catalyst A and contains, in proportion by weight to said carrier:
- 0.25% by weight of platinum,
- 0.25% by weight of rhenium,
- 0.025% by weight of indium,
- 1.15% by weight chlorine.

The Re/Pt ratio by weight of catalyst N is 1.

Catalyst P has the same carrier as catalyst A and contains, by weight, in proportion to said carrier:
- 0.25% by weight of platinum,
- 0.25% by weight of rhenium,
- 0.025% by weight of tin,
- 1.15% by weight of chlorine.

The Re/PT ratio by weight of catalyst P is 1.

Catalyst Q has the same carrier as catalyst A and contains by weight, in proportion to said carrier:
- 0.25% by weight of platinum,
- 0.50% by weight of rhenium,
- 0.05% by weight of indium,
- 1.15% by weight of chlorine.

The Re/Pt ratio by weight of catalyst Q is 2.

The results obtained with these various arrangements are given in Table 7 hereinafter.

TABLE 6

| | First reactor | | Second reactor | | Third reactor | |
|---|---|---|---|---|---|---|
| ARRANGEMENT | Catalyst | % b.w.* | Catalyst | % b.w.* | Catalyst | % b.w.* |
| 3 | A | 15% | B | 30% | B | 55% |
| 16 | A | 15% | N | 30% | N | 55% |
| 17 | A | 15% | P | 30% | P | 55% |
| 18 | Q | 15% | B | 30% | B | 55% |
| 19 | Q | 15% | N | 30% | N | 55% |

*% by weight in proportion to the total catalyst amount used in the three reactors, as a whole.

TABLE 7

| ARRANGEMENT | 3 | 16 | 17 | 18 | 19 |
|---|---|---|---|---|---|
| $H_2$ | 2.98 | 3.07 | 3.06 | 3.02 | 3.05 |
| $CH_4 + C_2H_6$ | 2.09 | 1.93 | 1.94 | 1.99 | 1.99 |
| $C_3H_8 + C_4H_{10}$ | 4.93 | 4.75 | 4.80 | 4.84 | 4.86 |
| $C_5^+$ | 90.00 | 90.25 | 90.20 | 90.15 | 90.10 |
| Characteristics of the $C_5^+$ fraction | | | | | |
| $d_4^{15}$ | 0.800 | 0.805 | 0.804 | 0.802 | 0.803 |
| RON | 97.5 | 97.9 | 97.8 | 97.6 | 97.7 |
| olefin % b.w. | 0.3 | 0.3 | 0.3 | 0.3 | 0.3 |
| naphthene % b.w. | 4.0 | 3.6 | 3.7 | 3.8 | 3.9 |
| aromatic % b.w. | 67.8 | 68.6 | 68.4 | 68.1 | 68.3 |

What is claimed as the invention is:

1. A catalytic reforming process wherein a hydrocarbon charge circulates, under reforming conditions in the presence of hydrogen, successively through at least two fixed beds of catalyst comprising a carrier, platinum, rhenium and optionally at least one halogen, the catalyst of the one or more first beds wherethrough passes the charge being a catalyst of A type, whose rhenium to platinum ratio by weight (expressed as elemental metal) is higher than the rhenium/platinum ratio by weight (expressed as elemental metal) of catalyst B contained in the one or more last beds wherethrough passes the charge, said catalyst of B type containing at least 0.08% by weight of rhenium in proportion to the carrier.

2. A process according to claim 1, wherein the rhenium/platinum ratio of catalysts of A type is from 1:1 to 5:1 and the rhenium/platinum ratio by weight of catalysts of B type is from 0.1:1 to 3:1.

3. A process according to claim 2, wherein the rhenium/platinum ratio of catalysts of A type is from 1.6:1 to 4:1 and the rhenium/platinum ratio of catalysts of B type is from 0.5:1 to 1.5:1.

4. A process according to claim 1, wherein the catalyst of each bed wherethrough passes the charge contains, in proportion by weight to the carrier, from 0.05 to 3% by platinum and from 0.08 to 3% of rhenium.

5. A process according to claim 1, wherein the catalyst of A type contains, in proportion by weight to the carrier, from 0.05 to 0.6% of platinum and from 0.10 to 3% of rhenium and the catalyst of B type contains, in proportion by weight to the carrier, from 0.05 to 0.6% of platinum and from 0.10 to 1% of rhenium.

6. A process according to claim 1, wherein the catalyst of each bed wherethrough passes the charge contains from 0.1 to 15% by weight of at least one halogen, in proportion to the carrier.

7. A process according to claim 1, wherein the catalyst carrier of each bed wherethrough passes the charge, mainly comprises alumina.

8. A process according to claim 1, wherein the proportion by weight of catalyst of B type is from 60 to 92% of the total catalyst mass.

9. A process according to claim 8, wherein the proportion by weight of catalyst of B type is from 80 to 90% of the total catalyst mass.

10. A process according to claim 1, wherein the catalyst of A type and/or the catalyst of B type further contains at least one metal M selected from the group formed of tin, germanium, lead, indium, thalium and titanium.

11. A process according to claim 10, wherein the amount of metal M contained in the catalyst of A type and/or of B type is from about 0.01 to 3% by weight in proportion to the carrier.

12. A process according to claim 1, wherein the hydrocarbon charge passes successively through at least three catalyst beds, the first catalyst bed wherethrough passes the charge containing a catalyst of A type whose rhenium/platinum ratio by weight is higher than the respective rhenium/platinum ratios by weight of the catalysts of A and/or B type and of B type contained in the other catalyst beds.

13. A process according to claim 1, wherein the hydrocarbon charge passes successively through at least three catalyst beds, the first and second respective catalyst beds wherethrough passes the charge containing a catalyst of A type whose rhenium/platinum ratios by weight are higher than the rhenium/platinum ratio by weight of the catalyst of B type contained in the other catalyst beds.

14. A process according to claim 1, wherein the hydrocarbon charge passes successively through at least three catalyst beds, said beds containing catalysts with a decreasing rhenium/platinum weight ratio, in the aggregate, from the first bed containing a catalyst of A type to the last bed containing a catalyst of B type.

* * * * *